Figure 1:
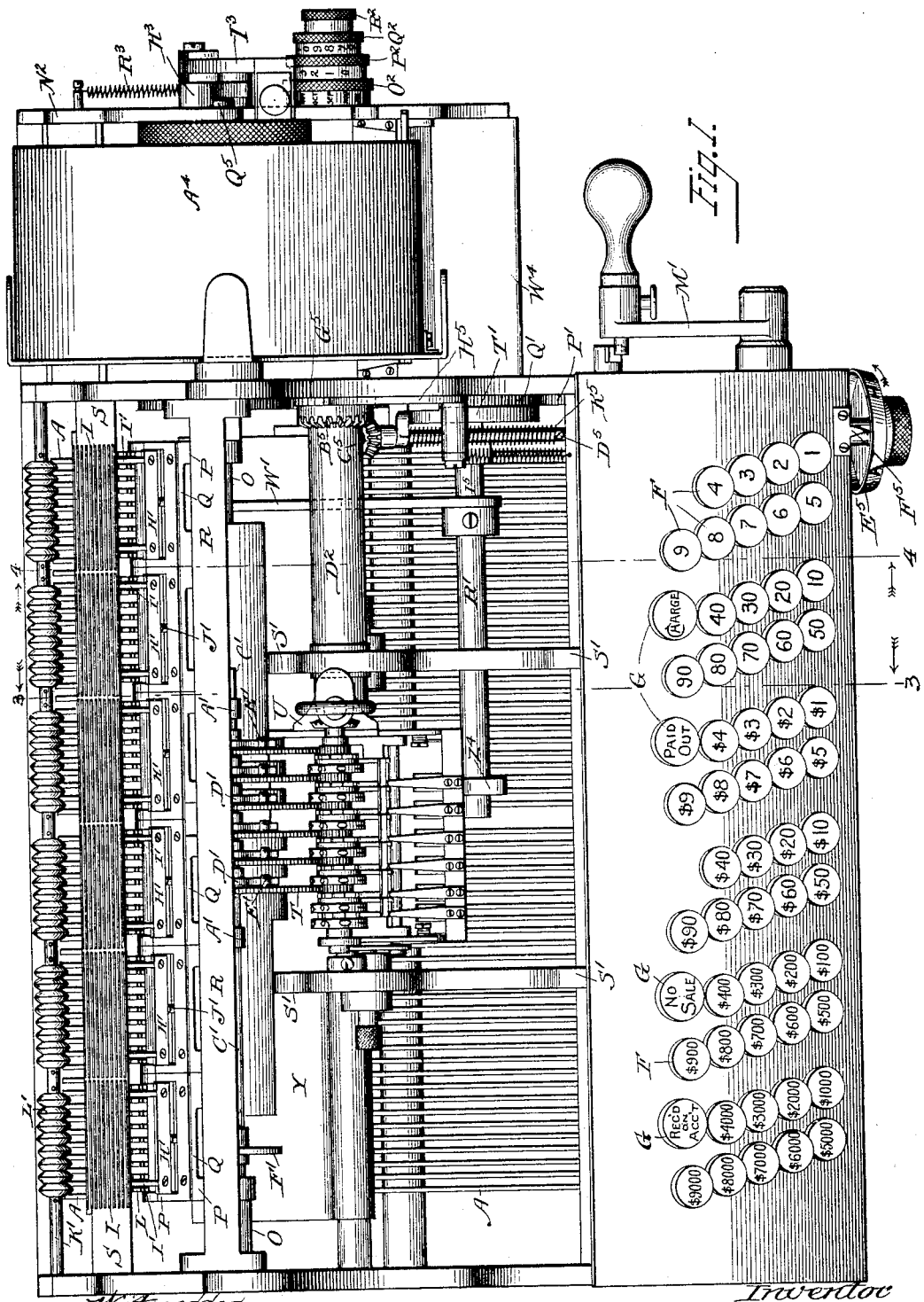

(No Model.) 6 Sheets—Sheet 1.

T. CARNEY.
CASH REGISTER.

No. 583,888. Patented June 8, 1897.

Witnesses
Martin H. Olsen
Lenora Wiseman

Inventor
Thomas Carney
by Edward Rector
his atty (No Model.) 6 Sheets—Sheet 2.
T. CARNEY.
CASH REGISTER.
No. 583,888. Patented June 8, 1897.
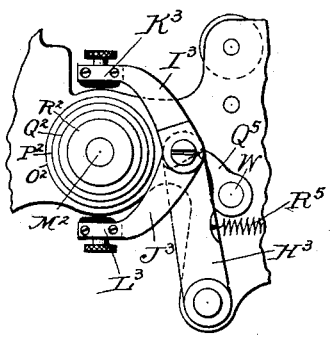
Fig. 2.a.
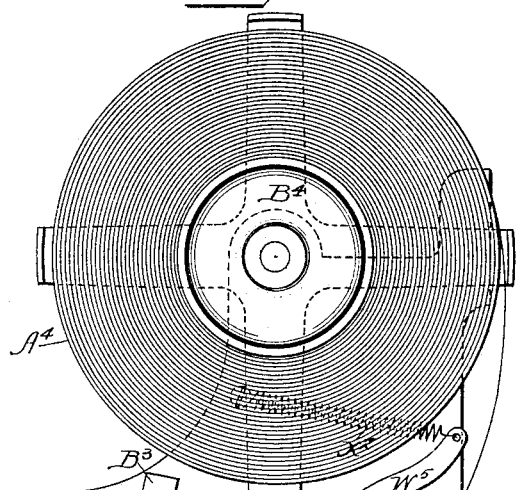
Fig. 2.
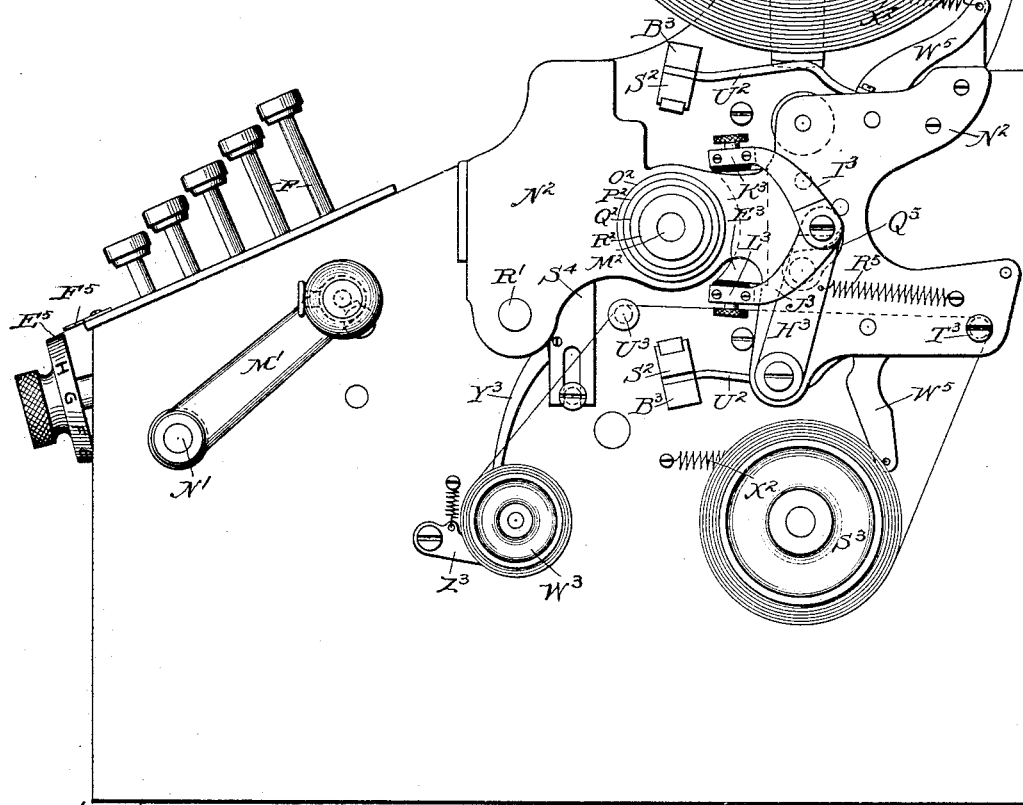
Witnesses
Martin H. Olsen.
Leonora Neuman.
Inventor
Thomas Carney
by Edward Rector
his atty.

(No Model.) 6 Sheets—Sheet 3.
T. CARNEY.
CASH REGISTER.
No. 583,888. Patented June 8, 1897.
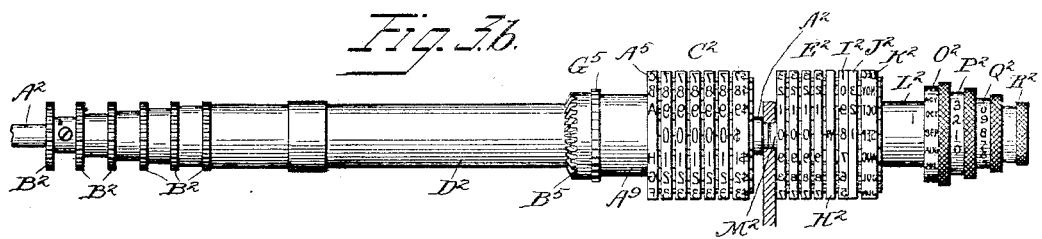
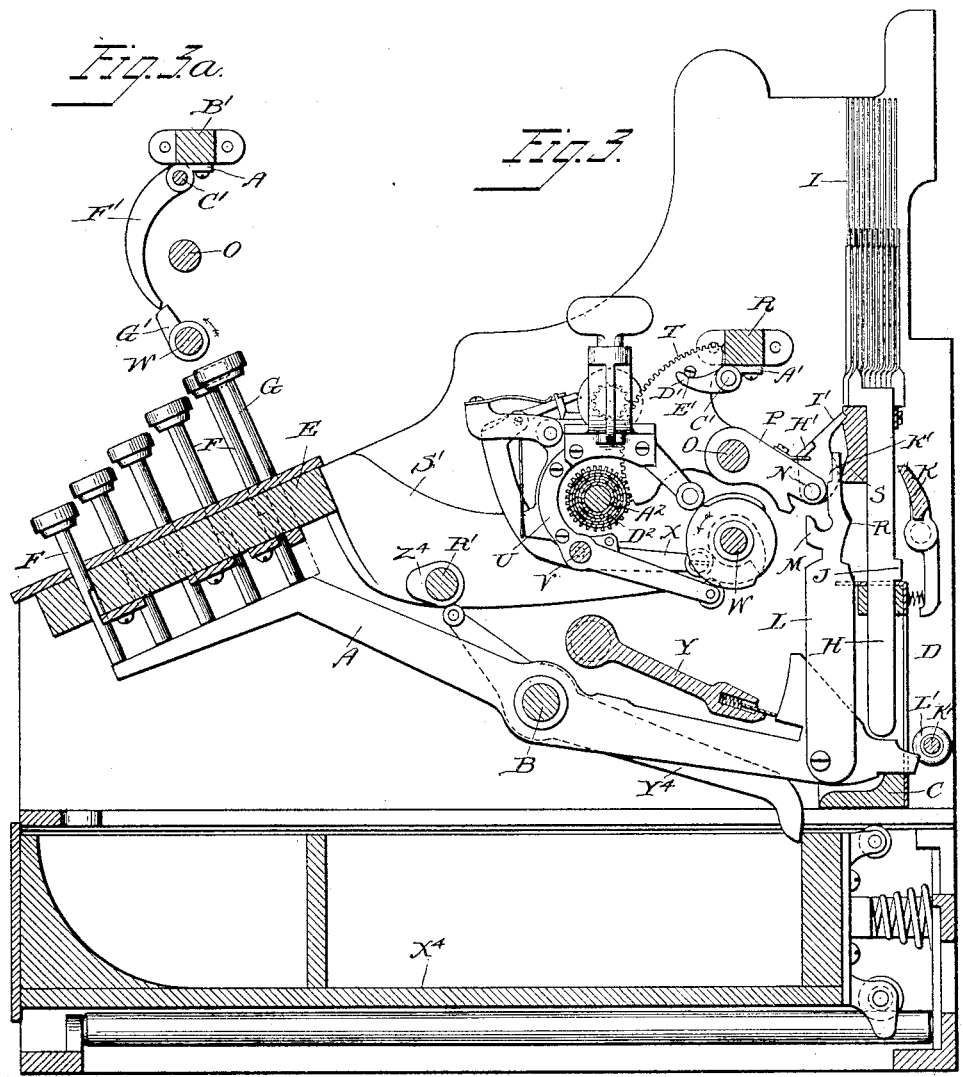
Witnesses
Martin H. Olsen
Leonora Wiseman
Inventor
Thomas Carney
by Edward Reiter
his atty.

(No Model.) 6 Sheets—Sheet 4.
T. CARNEY.
CASH REGISTER.
No. 583,888. Patented June 8, 1897.
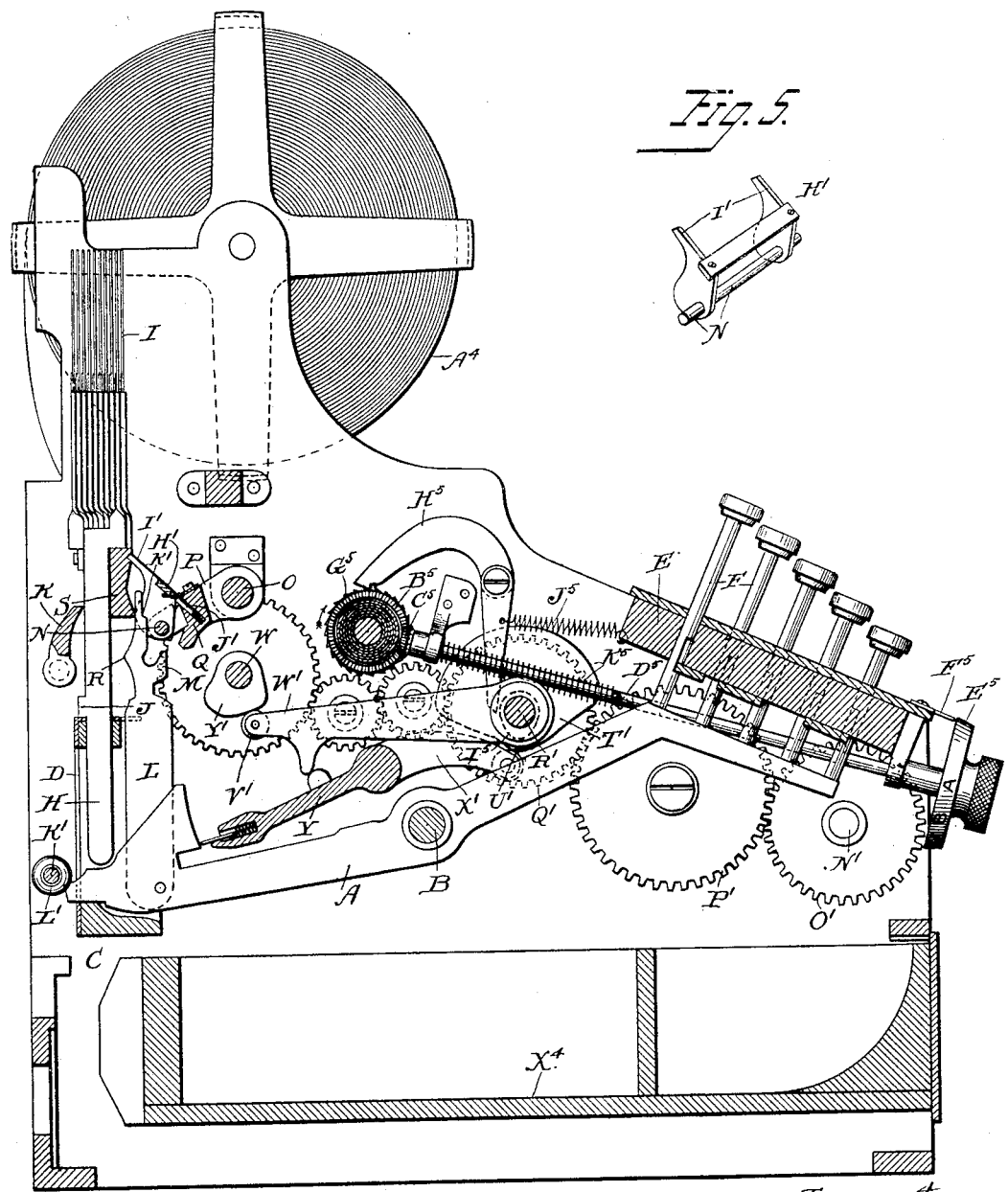
Witnesses
Martin H. Olsen.
Leonard Niemann.
Inventor
Thomas Carney
by Edward Rector
his atty.

(No Model.) 6 Sheets—Sheet 5.
T. CARNEY.
CASH REGISTER.
No. 583,888. Patented June 8, 1897.
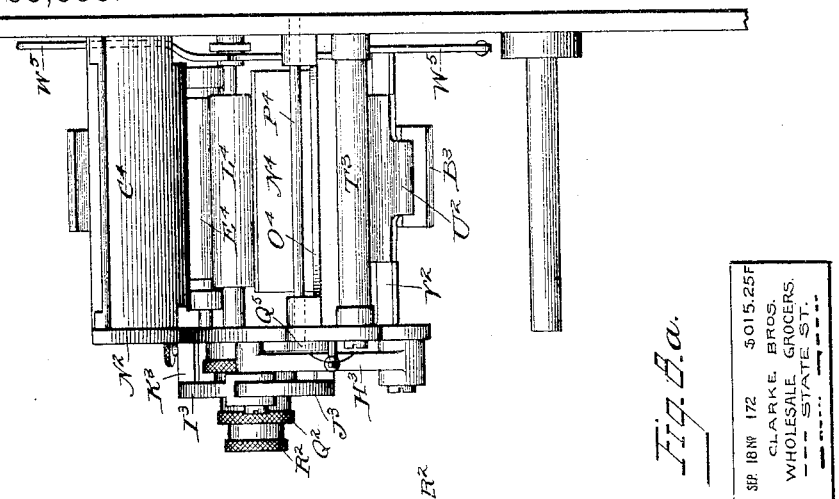
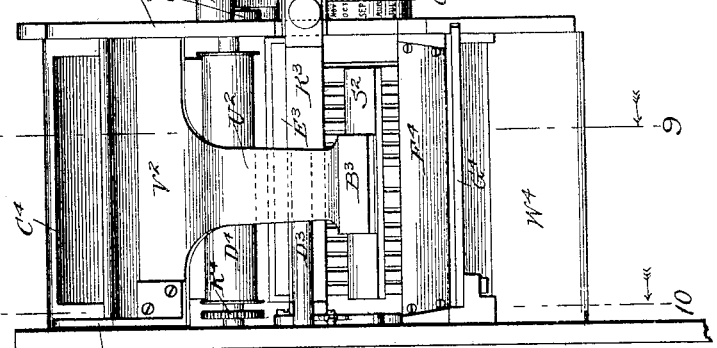
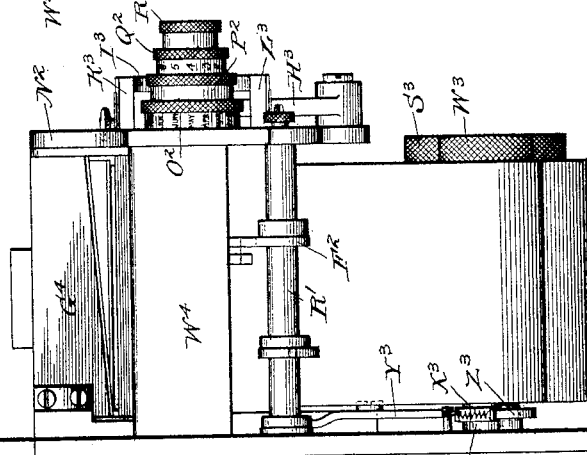
Witnesses
Martin H. Olsen
Leonora Newman
Inventor
Thomas Carney
by Edward Rector
his atty (No Model.) 6 Sheets—Sheet 6.
T. CARNEY.
CASH REGISTER.
No. 583,888. Patented June 8, 1897.
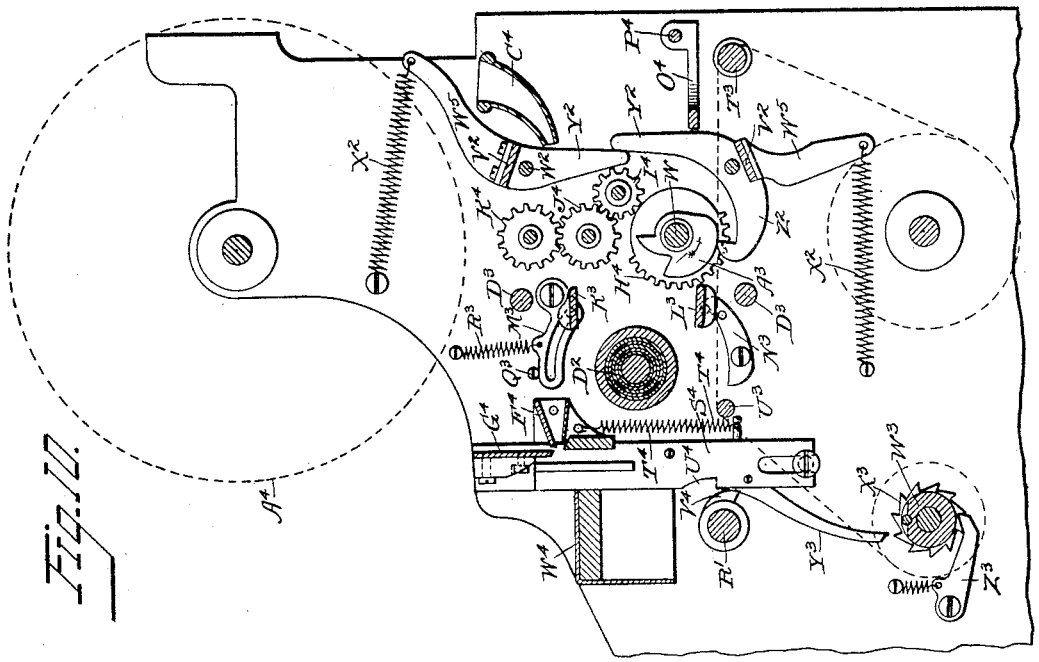
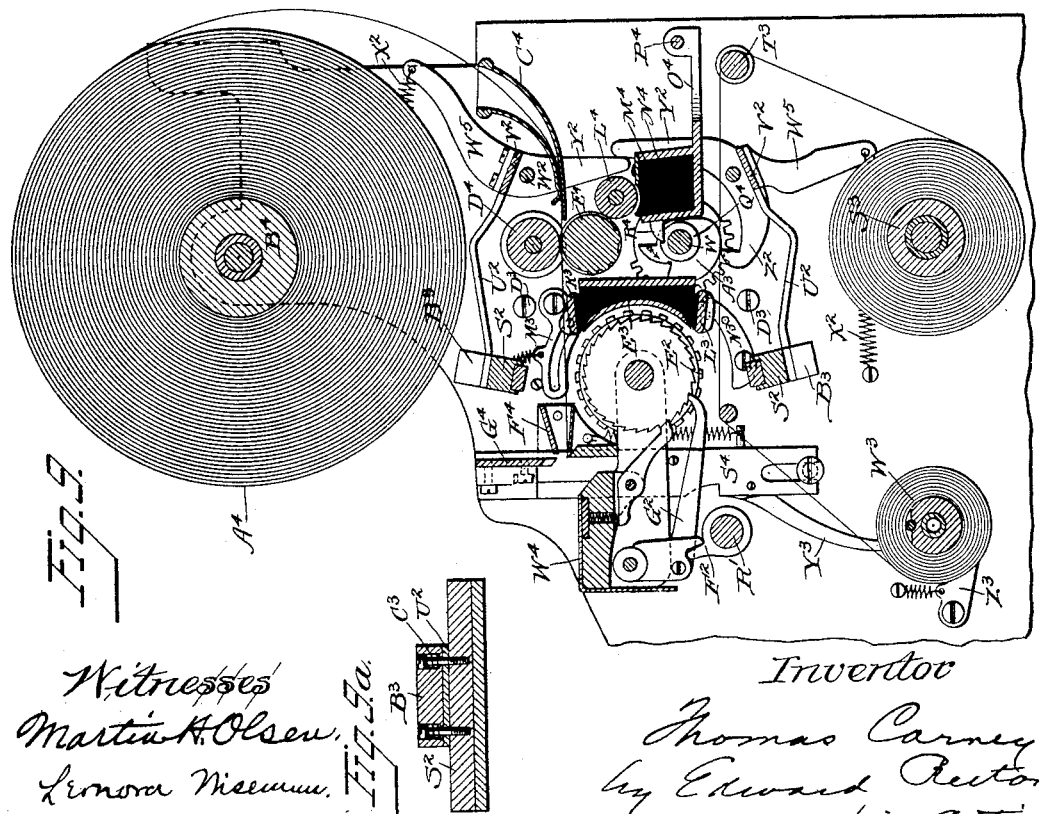
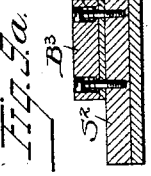
Witnesses
Martin H. Olsen
Lenora Wiseman
Inventor
Thomas Carney
by Edward Rector
his atty.

UNITED STATES PATENT OFFICE.

THOMAS CARNEY, OF DAYTON, OHIO, ASSIGNOR TO THE NATIONAL CASH REGISTER COMPANY, OF SAME PLACE.

CASH-REGISTER.

SPECIFICATION forming part of Letters Patent No. 583,888, dated June 8, 1897.

Application filed November 11, 1895. Serial No. 568,531. (No model.)

*To all whom it may concern:*

Be it known that I, THOMAS CARNEY, a citizen of the United States, residing at Dayton, in the county of Montgomery and State of Ohio, have invented a certain new and useful Improvement in Cash-Registers and Analogous Machines, of which the following is a description, reference being had to the accompanying drawings, forming part of this specification.

In its general construction and mode of operation my present machine is similar to that shown and described in my pending application, Serial No. 550,362, filed May 23, 1895; and my invention consists in certain improvements based upon that machine, but applicable to others as well, which will be hereinafter fully described, and pointed out in the claims.

In the accompanying drawings, Figure 1 is a top plan view of the complete machine with the casing removed; Fig. 2, an elevation of the right side or end of the same; Fig. 2ª, a detail view showing the inking-strips thrown forward into position to be forced against the types; Fig. 3, a vertical section of the machine approximately on the line 3 3 of Fig. 1; Fig. 3ª, a detail view showing the locking-cam and coöperating arm for locking the segments in normal position; Fig. 3ᵇ, a top plan view of the shaft and sleeves which carry the type-wheels and the pinions meshing with the segments by which they are turned; Fig. 4, a vertical section approximately on the line 4 4 of Fig. 1; Fig. 5, a detail view showing one of the locking-frames for the segments; Figs. 6, 7, and 8, a top plan view and front and rear elevations, respectively, of the printing attachment at the right side of the machine; Fig. 8ª, a plan view of one of the printed tickets; Fig. 9, a vertical section approximately on the line 9 9 of Fig. 6; Fig. 9ª, a sectional detail showing the means for connecting the impression-platens with their supporting-arms; Fig. 10, a vertical section approximately on the line 10 10 of Fig. 6.

The same letters of reference are used to indicate identical parts in all the drawings.

My present machine, like my aforesaid prior one, is designed to indicate to the customer and bystanders the amount of each sale, to add into one common total the amount of all sales made and registered, to print the amount of each sale upon the paper record-strip carried within the machine and also upon a paper check or ticket strip, the printed portion of which, constituting the check or ticket, is projected from the machine at each operation and severed from the strip, and also, preferably, to date and consecutively number such checks or tickets. In addition my present machine also prints the date and consecutive number of each transaction upon the record-strip before referred to, such dates and numbers being printed opposite the amounts representing the respective sales. The improvements forming the subject-matter of my present invention relate chiefly to the printing attachment and to means intermediate the operating keys or levers and the registering mechanism by which such mechanism is actuated and by which also the type-wheels of the printing attachment are set at each operation.

In my prior machine there were employed three sets of cash-keys, each containing nine keys and representing, respectively, units of cents, tens of cents, and units of dollars; but in my aforesaid application it was stated that a larger number of sets of keys might be employed to advantage under the plan of construction and mode of operation described, and accordingly in my present machine I employ and will illustrate in the drawings and describe in the specification six sets or groups of cash-keys, representing, respectively, units and tens of cents and units, tens, hundreds, and thousands of dollars, so that at a single operation of the machine any amount from one cent to nine thousand nine hundred and ninety-nine dollars and ninety-nine cents may be indicated, registered, and printed, as hereinafter described.

The operating keys or levers by or through which the registering mechanism is actuated and the type-wheels set consist of the levers A, fulcrumed on a shaft B and resting at their rear ends on a cross-bar C of the framework in the lower ends of vertical slots in a guide-plate D, secured to the rear side of the framework. Mounted above the front ends of the levers A in the inclined cross-plate E of the framework are the setting-keys F, consisting of the straight stems, resting at their lower ends upon the front ends of the respective levers A or adapted to be pressed downward into contact therewith and carrying at their upper ends numbered buttons representing their respective values. The levers A are arranged very closely together side by side, and to accommodate the nine setting-keys and their numbered buttons to the narrow space occupied by each set of levers the keys of each set are arranged in an inclined double row in the plate E of the framework, so that the lower end of each one of the key-stems may rest upon or immediately above one of the levers A. In addition to the several sets of cash-keys there are the four special keys G, each coöperating with a special lever A, as described in my former application.

Arranged in guide-plates above the rear ends of the levers A are the vertical indicator-rods H, one resting upon or supported immediately above each lever. Their upper ends are so bent as to bring the indicators I of each group into compact order, one behind another, as shown. The rods H are provided upon their rear sides with shoulders or projections J, which coöperate in the well-known manner with the pivoted supporting bar or wing K to temporarily support the exposed indicators at the end of each operation of the machine.

Pivoted to the side of each lever A, near its rear end, is the lower end of the vertical lifter arm or plate L, described in my prior application and also in various prior patents granted me. (See Patents Nos. 497,860 and 497,861.) These lifters are provided upon their forward sides or edges with the fingers M, which fingers, with the recesses or mouths formed by them, coöperate with the rear transverse rods N of the rocking registering-frames mounted upon the shaft O, each frame consisting of two end plates or arms P, hung at their forward ends upon the shaft O and the cross-rod N, and a cross-bar Q, connecting said plates. There is one of these rocking registering-frames for each set of keys, and the nine lifters L of each set are all arranged to coöperate with the single rod N of the frame above them. The fingers M of the lifters of each set are arranged at graduated distances from the rod N, with which they coöperate, so that the uniform vertical movements given said lifters will move their coöperating registering-frame different degrees, as described in my former application and also in my prior patents. The lifters L are provided upon their rear sides or edges with the cam-shoulders R, adapted to coöperate with the cross-bar S of the framework. When any lifter L is raised by the depression of the front end of its connected lever A, its finger M passes upward between the rod N and bar Q of its registering-frame, and the engagement of the cam-shoulder R upon its rear side with the lower forward edge of the cross-bar S throws the lifter forward and causes its recess or mouth above the finger M to embrace the rod N. The rear edge of the lifter, beneath its shoulder R, is of such shape that in its further upward movement the lifter may accommodate itself to the movement of the rod N in the arc of a circle concentric to its pivot O, and the shape of the finger M of the lifter and of the rear side or edge of the cross-bar Q of the registering-frame is such that when the finger M fully enters the space between said bar and the rod N and begins to lift the registering-frame it becomes locked or coupled thereto, so that after the registering-frame has been slightly moved by the lifter the two become so connected that neither can move independently of the other, with the result that from the time the lifter begins to move the registering-frame until the frame is returned to substantially normal position the lifter and frame, and consequently the lever A, to which the lifter is pivoted at its lower end, are compelled to move together.

The construction above described is substantially the same as that shown and described in not only my aforesaid pending application, but in the several patents heretofore granted to me, and is referred to here in detail for the purpose of more clearly explaining the improvements which I have added to this part of the machine.

Each of the registering-frames has rigidly secured to it, directly or indirectly, one of the gear-toothed sectors T, Figs. 1 and 3, by which the registering-wheels are actuated to register the values of the operated keys in the manner described in detail in the patents heretofore granted me and in my aforesaid application, the registering-wheels being mounted in a rocking frame U, pivoted upon a transverse shaft V in such manner that the pinions of the registering-wheels may be thrown into and out of gear with the respective sectors T to cause the movements of said sectors in one direction to be transmitted to the registering-wheels, and said rocking movements of the frame U to gear and ungear the registering-wheels and sectors being effected by suitable cams fast upon a rotary shaft W and coöperating with antifriction-rollers mounted upon the ends of the rearwardly-projecting arms of the frame U. The transfers between the several registering-wheels are also effected by cams fast upon said shaft W and actuating the transfer-pawls of the several wheels through the medium of levers X, pivoted upon the shaft V above referred to. There being nothing novel in this part of the mechanism it need not be here described more at length.

The levers A and their lifters L are operated by power transmitted to them through the medium of the universal bar or frame Y, overlying the entire lot of levers A in rear of their fulcrum-shaft B and hung at its opposite forward corners to the side frames of the machine, so that its rear edge is free to rise and fall. By the means described in my aforesaid application and prior patents, which means is illustrated in the accompanying drawings, but need not be here described in detail, the rear ends of the levers A become attached or coupled to the rear edge of the universal bar or frame Y whenever the front ends of the levers are slightly depressed, as may be done by pushing downward the setting-keys F. By the means hereinafter described the rear edge of the bar Y is given a definite movement upward and downward at each operation of the machine, moving from its normal position (shown in the drawings) upward to its limit of movement and then downward to a point below the normal position shown, so as to release the keys which are attached to and have been carried upward by it, and then, at the very end of the operation, move upward slightly to its normal position of rest.

From what has been heretofore said about the connection of the lifters with the registering-frames and the necessity for their moving together after once becoming connected it follows that the positive movement given by the bar Y to the operated levers A and lifters, positively returning them to their normal position at the end of each operation, will also serve to positively return the registering-frames to their normal position, the operated lifters becoming uncoupled or disconnected from the frames as the latter reach such position. The registering-frames themselves are therefore thus positively moved in both directions, from normal position and back to it. This enables me to dispense with the resetting-springs heretofore employed for yieldingly holding the registering-frames in and returning them to normal position. In the machines of my prior patents, where the levers A were operated directly by the hand of the operator depressing their front ends to their full limit of movement, there was no positive means provided for resetting the levers and the lifters and registering-frames, and the gravity of the bar Y and the stress of the springs connected to the registering-frames were depended upon for that purpose. In the machines of my aforesaid pending application, while positive means was there for the first time employed to reset the parts, and consequently the springs were not needed to return the registering-frames to normal position, yet after they had been returned thereto and the lifters disconnected from them some means was required for holding them in normal position and preventing accidental displacement of them therefrom, and for this purpose the resetting-springs connected to the registering-frames were shown in the drawings of my aforesaid prior application as they had been in the prior patents. Where, however, as in my present machine, a large number of sets of keys are employed and a correspondingly large number of resetting-springs for the registering-frames would be required, it follows that when any considerable number of said frames were actuated at any given operation of the machine the resistance of their springs, which would have to be overcome, would add materially to the load of the machine. In my present machine therefore, while dispensing with the resetting-springs and relying upon the positive movement of the parts to return the frames to normal position, I have provided means for effectually preventing their accidental displacement therefrom and for positively holding or locking them in said position except when they are to be actuated in the operation of the machine. In the first place I have provided means common to all of the frames for locking them in normal position so long as the operating-handle and driving mechanism of the machine are in their normal position of rest. This lock, however, is released at the beginning of each operation of the machine, so that so far as it is concerned the registering-frames are then all free to be moved. To still further lock them, therefore, and to permit only those to be moved which correspond to the groups of keys in which levers A have been set and connected to the universal bar Y, so that only those are free to move which are to be actually employed at that operation of the machine, I provide a second set of locking devices, there being one locking device for each registering-frame, and such locking device being controlled by the keys or lifters coöperating with such frame in such manner that unless the locking device be released by or consequent upon the operation of some key in that set the frame will remain locked. These two locks may now be described.

Mounted in bearings A' upon the under side of a cross-bar B' of the framework, against whose forward side the upper rear ends of the sectors T normally rest, Fig. 3, is a rock-shaft C', extending from a point slightly to the right of the sectors to a point adjacent the left side of the machine, Fig. 1. Fast upon this rock-shaft are a series of forwardly-projecting arms or fingers D', one beside each sector T, and each sector has projecting from its side a stud or pin E', adapted to coöperate with the adjacent arm D'. In the normal position of the parts shown the arms D' fit against the under side of the pins E', so that no one of the sectors can be moved without depressing the adjacent arm D' and consequently rocking the shaft C', and thereby depressing all of the arms. The shaft C' is normally locked in the position shown, thereby locking all of the sectors in normal position, by means of an arm F', Figs. 1 and 3ª, upon the left-hand end of the shaft and depending therefrom and in the normal position of the parts resting at its lower end upon a cam G', fast upon the rotary shaft W, heretofore referred to. So long as this cam G' remains immediately beneath the arm F', as in Fig. 3ª, the shaft C' will be held locked in normal position, but as soon as the cam is carried from under the arm F', as it is at the beginning of each operation of the machine and consequent rotation of the shaft W, the shaft C' will be released and left free to yield and be rocked forward by the forward movement of any one of the sectors T, as will be readily understood. At the end of the operation of the machine, as the parts come to normal position again, the cam G' will ride under the arm F' again, and thereby return the rock-shaft C' to normal position and throw up all of the arms D', which latter will engage the pins E' on the sectors T and insure the complete resetting of the latter, bringing them up against the bar B'.

The second one of the two locking devices above referred to may be next described, as follows: Loosely mounted upon the rear cross-rod N of each of the rocking registering-frames is a locking-frame H', Figs. 3, 4, and 5, consisting of two end plates hung upon the rod N and a cross bar or plate rigidly connecting them. The two end plates are extended upwardly and rearwardly and shaped to form locking-dogs I', which rest against the forward face of the cross-bar S of the framework heretofore referred to. The forward face of this bar is provided near its upper edge with a longitudinal recess or groove, in which fit the rear ends of the locking-dogs I' when the parts are in normal position. A spring suitably applied to the locking-frame yieldingly presses it rearward and causes the dogs to engage the groove. In this instance the spring is confined in a bore in the cross-bar Q of the registering-frame, which carries the locking-frame and bears on a sliding block or plunger J', fitted in the bore and pressing at its outer end against the front edge of the cross-bar of the locking-frame H', Figs. 1 and 4. Now it will be seen that when the parts are in their normal position of rest, with the dogs I' engaged in the groove in the bar S, the registering-frames will be locked from movement, so that it will be impossible to displace any of the sectors T from normal position. Any one of the registering-frames may be unlocked, however, by swinging its locking-frame H' upward and forward until the dogs I' of such locking-frame are disengaged from the groove in the bar S. Now each of the lifters L is provided upon its front edge, near its upper end, with a shoulder K', which, when the lifter is moved upward, contacts with the cross-bar of the locking-frame just as the finger M of the lifter passes upward in front of the cross-rod N of the registering-frame and forces the locking-frame H' upward and forward out of locking position just as the lifter begins to move the registering-frame. In this manner the operated lifter in any given set unlocks the registering-frame immediately before it begins to move such frame, while all of the registering-frames corresponding to sets of keys in which no key and lifter are operated remain locked. In this manner and by this means all of the registering-frames are normally locked by their respective locking-frames H', and at each operation of the machine those frames which correspond to the sets containing the operated keys are automatically unlocked to permit the operated lifters to actuate them. By the employment of these locking devices, particularly those last described, I am enabled to dispense with the resetting-springs for the registering-frames and thereby lighten the load of the machine and at the same time insure the perfect operation of all the parts. The form and arrangement of the locking devices may be varied without departing from this feature of my invention, since so far as I am aware I am the first in the art to devise an automatic locking device of any sort for the purpose described.

For the purpose of preventing the simultaneous operation of two keys in the same set, and the consequent inaccuracy in registration which would result therefrom, I employ the locking devices shown in Figs. 1, 3, and 4. As there shown, there is a transverse shaft K' extending from side to side of the machine above and slightly in rear of the projecting rear ends of the levers A in rear of the vertical guide-plate D, heretofore referred to. Strung upon this shaft are a series of circular locking-disks L', having beveled or rounded edges. There are eight of these disks for each set of levers, one disk overlying the space between each two adjacent levers, with the lower forward portion of its beveled edge fitting between the ends of the two levers. The disks are slightly wider than the spaces between the keys, so that if it be attempted to simultaneously lift the rear ends of any two keys in the same set the intermediate disk or disks L' will become wedged between such two keys and prevent their upward movement. When, however, the rear end of a single key is lifted, it will pass between the forward edges of the two disks on either side of it and force them apart.

The means heretofore referred to for giving the universal bar Y its upward and downward movements at each operation may be next described: The operating-handle M' is fast upon the end of a short shaft N', Figs. 2 and 4, which is journaled in a bearing in the right-hand side frame of the machine and which has fast upon its inner end a gear O', meshing with a gear P', which in turn meshes with a gear Q', fast upon a shaft R'. This shaft R' extends from a point about the middle of the machine, Fig. 1, to the right through and some distance beyond the right-hand side frame, fitting at its outer end in the outer side plate of the printing attachment, hereinafter described. Toward its left-hand end it has a bearing in the right-hand one of the two backwardly and forwardly extending frame-plates S'. Fast upon this shaft R', at the left of the gear Q', is a cam-disk T', which coöperates with a roller U' upon a stud projecting laterally from the front end of an arm X', fast upon or formed integral with the universal bar Y. At each revolution of the operating-handle this cam T' will depress the front end of the arm X' and thereby lift the rear edge of the bar Y. If a disk provided with a cam-groove in which the roller U' might fit were employed instead of the cam T', then the one cam would serve to move the arm V' and bar Y positively in both directions; and this substitution might be readily made, but in constructing the present machine there was not convenient room for the employment of a disk large enough to contain a proper cam-groove for the purpose, and I therefore provided the following additional means for giving the bar Y a positive downward movement: Hung at its forward end upon the shaft R', above described, is an arm or lever W', whose rear end carries a roller V', underlying and fitting against a cam Y', fast upon the rotary shaft W, heretofore described. This lever W' is provided on its under edge near its rear end with a pendent projection or swell which rests upon the rounded upper side of a lug upon the upper surface of the bar Y. The shape of the cam Y' and adjustment of the parts are such that the lever W' is snugly confined between the cam and the bar Y during the entire upward and downward movement of the latter, so that the bar is positively moved in both directions by the cams T' and Y', the same as though a disk containing a cam-groove were employed instead of the cam T', as heretofore suggested.

By means of a train of gears intermediate the gear Q' and the shaft W, Fig. 4, the latter is geared to the operating-handle and is given a rotation at each operation of the machine.

The remaining features of my invention relate to the printing attachment by which the numbers, dates, and amounts of the various transactions are printed upon the paper record and check strips and the latter projected from the machine and the printed check or ticket severed from it. Journaled at its left-hand end in the left-hand one of the two frame-plates S', Figs. 1, 3, and 3$^b$, is a shaft A$^2$, which extends to the right through the second plate S' and on through the right-hand side frame of the machine. Fast upon this shaft, near its left-hand end, is a gear B$^2$, meshing with the left-hand one of the six sectors T, Fig. 3$^b$, while fast upon the extreme right-hand end of said shaft is the right-hand one of the type-wheels C$^2$, bearing two sets of type-numbers, each representing the nine digits, the two sets of numbers being separated at diametrically opposite sides of the wheel by dollar-marks, which latter normally stand at the printing-points vertically above and below the axis of the wheel. Mounted upon the shaft A$^2$ are five concentric sleeves D$^2$, each having fast upon its left-hand end a gear B$^2$, meshing with one of the sectors T, and upon its extreme right-hand end one of the six type-wheels C$^2$, each of which, excepting the right-hand one above described, bears two sets of type-numbers, each representing the nine digits and separated by ciphers. Owing to this gearing of the type-wheels to the sectors the downward and forward movement of any of the sectors at a given operation of the machine to register the values of the operated keys, in the manner before explained, will also operate to turn the corresponding type-wheels and cause them to bring to the printing-points the numbers representing the values of the operated keys, and while such numbers are at the printing-points the paper strips are forced against the type by platens hereinafter described and the printing thereby effected, after which, during the latter part of the operation, the type-wheels are returned with the sectors to normal position.

Immediately at the left of the type-wheels C$^2$, adjacent the side frame of the machine, is a type-wheel A$^5$, which is fast upon the right-hand end of a short sleeve A$^9$, surrounding the sleeves D$^2$ and extending to the left through the side frame of the machine. Secured upon its left-hand end is a beveled gear B$^5$, Figs. 1, 3$^b$, and 4, which meshes with a beveled pinion C$^5$, fast upon the rear end of a forwardly-extending shaft D$^5$, whose front end projects outside the casing of the machine and has secured upon it an index-disk E$^5$, coöperating with a fixed pointer F$^5$ and provided with a milled thumb-piece, by which the shaft can be turned. The type-wheel A$^5$ bears upon its periphery two diametrically opposite duplicate characters or letters, in this instance the first eight letters of the alphabet, while the index-disk E$^5$ is provided with the same letters or characters. When said disk is turned until one of its letters is brought opposite the pointer F$^5$, the two corresponding type-letters upon the wheel A$^5$ will be brought to the two printing-points. The sleeve which carries the wheel A$^5$ has fast upon it, at the right of the gear B$^5$, a ratchet G$^5$, with which coöperates a holding-pawl in the form of a bent lever H$^5$, whose forward end extends downward from the pivot of the lever and projects into the path of a cam I$^5$, fast upon the rotary shaft R, heretofore described. A spring J$^5$, connected to the lever H$^5$, normally holds its rear end in engagement with the ratchet G$^5$, so that when the shaft D$^5$ is turned in the direction of the arrow, Fig. 1, to bring some letter upon the index-disk E$^5$ opposite the pointer F$^5$ and the corresponding type-letters to the printing-point the engagement of the pawl-lever with the ratchet will hold the parts in the position to which they may be turned. They will remain in this position during the operation of the machine until after the printing has been effected, whereupon the cam I$^5$ will contact with the lower end of the lever H$^5$ and throw its rear end upward out of engagement with the ratchet, whereupon the parts will be reset to normal position by a coiled spring K$^5$, surrounding the shaft D⁵ and secured at its front end to said shaft and at its rear end to the fixed bearing of the rear end of said shaft. As explained in my prior application, these devices are employed for the purpose of designating either different classes of transactions or sales made by different clerks and preserving a record showing the character of the transaction represented by each amount printed upon the record-strip and check-strip or the particular clerk by whom each sale was made.

Mounted at the right of the type-wheels C², upon an axis concentric with that of the wheels, are the consecutive-numbering wheels E². The primary one of these wheels is advanced one number at each operation of the machine by a cam F², Fig. 9, fast upon the rotary shaft R', heretofore described, said cam at each operation of the machine reciprocating the pawl G², by which said wheels are actuated in the usual well-known manner. These consecutive-numbering wheels are provided with double series of numbers diametrically opposite each other, so that types representing the same numbers are always presented at the two printing-points.

Immediately at the right of the wheels E² is located a fixed disk H², Fig. 3ᵇ, bearing in the printing-line the type-character "No.," representing the word "number," to be printed immediately at the left of the consecutive number. At the right of the disk H² are the dating-wheels, consisting of the two "day-wheels" I² and J² and the "month-wheel" K². These wheels are fast upon the left-hand ends of three concentric sleeves L², mounted upon a shaft M², upon whose left-hand end the consecutive-numbering wheels E² are mounted. Fast upon the right-hand end of the sleeves L², at the right of the side frame-plate N² of the printing attachment, are index-disks O², P², and Q², the former being fast upon the sleeve which carries the month-wheel K², the second upon the sleeve which carries the day-wheel J², and the third upon the sleeve which carries the day-wheel I². Each of these index-disks is provided with a projecting flange having a milled edge, by which the disk may be turned to adjust the wheels. Fast upon the extreme right-hand end of the shaft M² is a metal thumb-piece R², by which said shaft may be turned for the purpose of resetting the wheels E² to zero, the usual means intermediate the shaft and the wheels for that purpose being employed.

From the foregoing description it will be seen that there is a single printing-line at the upper and lower sides of the several sets of wheels, each line containing at its left-hand end first the type-letter upon the wheel A⁵, then next the type-numbers upon the wheels C², representing the amount registered, and at the right thereof type-numbers representing the consecutive number of the transaction, and at the right of the consecutive number the number and character representing the date, so that the date, consecutive number, and amount of the transaction, and the letter indicating its character may be printed in a single line at each printing-point.

The impression-platens and means for actuating them and the means for inking the types may be next described. Each platen in the present instance consists of a long metal bar S², having a strip of rubber confined in its side adjacent the type-wheels. This platen is carried, in the manner hereinafter described, upon the front end of an arm U², forming an integral part of a thin cross bar or plate V², Fig. 6, bent to form ears at its opposite ends, by which it is hung upon a rod W², mounted at its outer end in the frame-plate N² of the printing attachment and at its opposite end in the main side frame of the machine, Figs. 9 and 10. At its end adjacent the latter frame the cross-bar V² is provided with a projecting arm W⁵, to whose outer end is connected a coiled spring X², whose front end is connected to the side frame of the machine. The same ends of the cross-bar V² are likewise provided with vertical arms Y², that of the upper bar extending downward and that of the lower bar extending upward, and the upper end of the lower arm Y² fitting against the rear side of the lower end of the upper arm. The lower one of these platen-supporting frames is also provided with a forwardly-extending arm Z², whose front end is curved upwardly and bears against the periphery of a rotary disk A³, Fig. 10, fast upon the rotary shaft W, heretofore described, said shaft extending to the right through the right-hand side frame of the machine and on across the printing adjustment and having its extreme right-hand end journaled in the frame-plate N² of the printing attachment. The engagement of the arm Z² with the disk A³ normally holds the platen-supporting frames in the position shown, with the platens retracted from the type-wheels, against the stress of the springs X², tending to throw the platens against the types. The disk A³, however, is provided with two notches, (or with a wide cut-away space and a deep notch,) and when one of them is brought opposite the end of the arm Z² the platen-frames will be no longer held in normal position against the stress of the springs, but the latter will be permitted to throw the platens against the types. In this manner at each operation of the machine and complete revolution of the disk A³ the platens will be thrown against the types and retracted to normal position twice in succession for a purpose hereinafter explained.

In order that the platens may strike the types a quick short blow and be instantly retracted therefrom, they are secured to the front ends of the arms U² of the platen-supporting frames in the following manner: Each of said arms has secured upon its front end opposite the cross-bar S², which carries the rubber strip, a block B³. Near its opposite ends each of these blocks is provided with a vertical bore communicating at its lower end with a smaller hole in the front end of the arm $U^2$, Fig. $9^a$. Coiled springs $C^3$ are confined in these bores, and screw-pins are passed through them and screwed into the platen-bar $S^2$, the springs being confined between the heads of the screws and the bottom of the bores in the block $B^3$. When the platens are drawn toward the types by the action of the springs $X^2$, the arms $U^2$ of the platen-supporting frames are arrested by contact with stops $D^3$, projecting from the main side frame of the machine, before the platens have struck the types, whereupon the momentum of the platen-bars $S^2$ carries them onward against the types, overcoming the resistance of the coiled spring $C^3$, and as soon as they have struck the types they are instantly retracted therefrom by said springs before the platen-frames are moved backward toward normal position by the action of the disk $A^3$. In this manner a very quick sharp blow of the platens against the types is obtained and clean clear printing thereby produced.

The means for inking the types may be next described as follows: The supply of ink is carried in a reservoir $E^3$, located in fixed position immediately in the rear of the type-wheels, its top immediately above and its bottom below the horizontal plane of the axis thereof. This reservoir is filled with a sponge or other absorbent filling $F^3$, which is saturated with ink and is exposed along the open top and bottom thereof. Pivoted at its lower end to the frame-plate $N^2$ is a vertically-extending arm $H^3$, Fig. 2. This arm has pivoted to its outer side at its upper end two forwardly-extending curved arms $I^3$ $J^3$, to the forward ends of which are secured the extreme right-hand ends of two transverse inking strips or pads $K^3$ $L^3$, Figs. 6, 9, and 10, the former in the normal position of the parts resting upon the top of the ink-reservoir and the latter pressing against its bottom. Each of these inking-strips consists of a metal strip extending transversely across the type-wheels and provided upon its side adjacent said wheels with an inking-pad of suitable material. At its extreme left-hand end the strip $K^3$ is supported and guided in a slot in a plate $M^3$, Figs. 9 and 10, pivoted upon the main side frame of the machine and yieldingly held in its normal position against a suitable stop $Q^3$ by a spring $R^3$. The strip $L^3$ at its left-hand end rests upon the curved upper edge of a plate $N^3$, secured to the side frame of the machine. Under this construction and arrangement of the parts, if the upper end of the arm $H^3$ be thrown forward the inking-strips $K^3$ $L^3$ will by such movement be brought to position immediately above and immediately below the printing-lines across the type-wheels at the opposite sides thereof, Fig. $2^a$. Now at the proper time in each operation of the machine they are moved to such position by the action of a cam $Q^5$, fast upon the extreme right-hand end of the rotary shaft W, before referred to, said cam bearing against a projection upon the inner side of the upper end of the arm $H^3$ to force the latter forward against the stress of the coiled spring $R^5$, tending to hold it in normal position. The adjustment of the parts is such that immediately after the cam $Q^5$ has moved the parts to the position mentioned, with the inking-strips across the printing-lines, the first of the two notches in the disk $A^3$ will be brought opposite the end of the arm $Z^2$ and the platens be thereby permitted to be thrown against the type-wheels by the action of the springs $X^2$ in the manner heretofore described. At such operation the platens will contact with the outer faces of the inking-strips and force said strips against the types to ink them, the platens being instantly retracted by the springs $C^3$ and then lifted to normal position by the cam-disk $A^3$ in the manner before explained, and the inking-strips also following them slightly away from the types. Immediately after this inking of the types the cam $Q^5$, which has thrown the inking-strips forward to inking position, will clear the projection upon the arm $H^3$ and the latter will be retracted by the spring $R^5$, carrying the inking-strips back to normal position. Shortly thereafter, in the operation of the machine, the second notch or cut-away space of the disk $A^3$ will be brought opposite the end of the arm $Z^2$ and the platens be again thrown against the type-wheels. At this second operation the inking-strips will be out of the way and nothing will interpose between the platens and the type-wheels excepting the paper strips hereinafter described, so that the printing upon said strips will be then effected.

The paper record-strip heretofore mentioned is carried upon a reel $S^3$ and led thence upward over a guide-rod $T^3$, thence forward beneath the lower inking-strip $L^3$ and between the lower platen and type-wheels, and thence over a second guide-rod $U^3$ and downward around a storage-reel $W^3$. This storage-reel has fast upon its inner end, adjacent the side frame of the machine, a ratchet $X^3$, with which coöperates a reciprocating pawl $Y^3$, hereinafter referred to, and by which the ratchet is advanced the space of one tooth at each operation of the machine and the reel thereby turned to draw forward the record-strip after each printing operation. A holding-pawl $Z^3$, engaging the ratchet, prevents backward movement of the reel.

The paper check-strip $A^4$, from which the printed checks or tickets delivered from the machine are formed, is carried in a roll upon a reel $B^4$, secured to the outer side of the side frame of the machine near its upper end. From the rear side of said roll the strip is led downward through a guide-chute $C^4$, Fig. 9, thence forward between a pair of feed-rollers $D^4$ $E^4$, thence onward above the upper inking-strip $K^3$, across the upper sides of the type-wheels, through a second guideway $F^4$, and out of the machine beneath a vertically-reciprocating knife-bar G⁴, mounted at its outer end in a guideway in the frame-plate N² and at its inner end on guides upon the main side frame of the machine, Fig. 10. The rollers D⁴ E⁴ are geared together and intermittently turned to advance the paper strip by means of a mutilated gear or segment H⁴, fast upon the shaft W beside the disk A³, heretofore described. At each revolution of said shaft the teeth of the gear H⁴ will engage a pinion I⁴, which in turn meshes with a pinion J⁴, fast upon the spindle of the lower roller E⁴, and meshing with a pinion K⁴, fast upon the spindle of the roller D⁴. The rollers D⁴ E⁴ may consist of ordinary feed-rollers, but I prefer to employ combined feeding and printing rollers, one roller bearing the type-matter and the other acting as an impression-roller to coöperate therewith. In the present instance the roller D⁴ is the impression-roller and the roller E⁴ beneath it the printing or type roller. The latter may bear any suitable type-matter, that usually employed being the business-card of the proprietor of the establishment, with instructions to pay the cashier the amount of the check, the attachment of the present machine producing, for instance, such a check as that shown in Fig. 8ᵃ. For the purpose of inking the type-roller E⁴ there is employed the inking-roller L⁴, upon the left-hand end of whose spindle is the pinion I⁴, above mentioned. This roller L⁴ is inked by a saturated ink-pad M⁴, contained in a second ink-reservoir N⁴, Fig. 9, secured upon the front end of a frame O⁴, whose rearwardly-projecting arms are hung upon a rod P⁴, extending from the frame-plate N² to the side frame of the machine. The pad M⁴ does not normally bear against the under side of the roller L⁴, but rests a short distance beneath it, and at each operation of the machine is moved upward against the roller by the action of a cam Q⁴, fast upon the shaft W, and coöperating with a projecting lug R⁴ upon the front side of the reservoir N⁴, near the middle of the latter, the lug resting upon the periphery of this cam and the cam operating to lift the reservoir and press the pad against the roller L⁴ at each operation.

The left-hand or inner end of the knife-bar G⁴, heretofore described, is secured to a vertically-reciprocating plate or bar S⁴, suitably guided upon the outer face of the side frame of the machine, Fig. 10, and normally held in its upper position by a coiled spring T⁴. In its forward edge this plate S⁴ is provided with a notch U⁴, with which coöperates a cam V⁴, fast upon the rotary shaft R′, heretofore described. At each operation of the machine and rotation of said shaft the cam V⁴ will engage the notch U⁴ and depress the plate S⁴ and knife-bar G⁴ at the proper time to cause the printed check to be severed from the projecting front end of the strip A⁴, such severed check then resting upon the horizontal top of the angle-plate W⁴, which forms a sort of housing for the parts beneath and in the rear of it. The vertically-reciprocating bar S⁴ carries the pawl Y³, heretofore referred to, whose lower end coöperates with a ratchet X³ upon the storage-reel W³ to turn the latter at each operation of the machine and draw forward the record-strip.

From the foregoing description it will be seen that the date, number, and amount of each transaction are printed in a single line transversely of the record and check strips. Heretofore neither the date nor the number of the transaction has usually been printed upon the record-strip, merely the amount being printed on said strip, while on the check-strip the number and date, the amount, and the advertisement or business card have been printed in order longitudinally of the strip. In such cases paper strips of about one-third the width employed in my present machine have been used, and the result has been that each check formed from the check-strip consumed about three times the length of the strip necessary in the present machine to form such check. The check-strip was therefore used up much more rapidly in such machine than in my present one and a new supply had to be placed in the machine much more frequently than is necessary in my present machine where the checks are formed by narrow transverse pieces cut from the end of the strip. Under the old arrangement also it was not possible to print the dates and numbers of the transactions on the record-strip without considerable complication of the mechanism, nor without the necessity of advancing said strip so far at each operation of the machine as to render the arrangement entirely undesirable, if not wholly impracticable.

The machine is provided with the usual forwardly and backwardly sliding money-drawer X⁴, adapted to be locked, when moved to closed position, by the rear end of a lever Y⁴, Fig. 3, which catches in front of the upper edge of the rear wall of the drawer and holds it in closed position. The front end of said lever Y⁴ stands in the path of a cam Z⁴, fast upon the left-hand end of the rotary shaft R′, before referred to, by which cam the lever is rocked and disengaged from the drawer at each operation of the machine and the usual spring behind the drawer permitted to throw it open.

Having thus fully described my invention, I claim—

1. In a machine such as described, the combination, with the sectors T and the driving mechanism for positively moving the same in both directions, of means actuated by said driving mechanism and coöperating with the sectors at the end of the operation of the machine to return them completely to normal position, substantially as described.

2. In a machine such as described, the combination, with the sectors T in normal position resting against the bar R, and the driving mechanism for actuating the sectors, of means operated by said driving mechanism and coöperating with the sectors at the end of the operation of the machine to force them into normal position against said bar, substantially as described.

3. In a machine such as described, the combination, with the sectors T and the driving mechanism for actuating the same, of locking means controlled by said driving mechanism and coöperating with the sectors and their actuating means to lock the sectors at the end of each operation and release them at the beginning of each operation of the machine, substantially as described.

4. The combination, with the sectors T and means for actuating them, of the rock-shaft C′ having the arms D′ coöperating with the sectors, and means for actuating the rock-shaft to return it to and hold it in normal position at the end of each operation and to release it at the beginning of each operation, substantially as described.

5. The combination, with the sectors T having the projections E′, of the rock-shaft C′, the arms D′ fast thereon and coöperating with the projections E′, the arm F′ fast upon said shaft, and the cam G′ coöperating with the arm F′, substantially as and for the purpose described.

6. The combination of a series of keys, a movable frame common thereto and moved from normal position by the operation of any key and returning to normal position with such key, and a lock for said frame controlled by the keys and operating to lock said frame from movement when the frame and keys are in normal position and to release it when any one of the keys is operated and permit such key to move it.

7. The combination of a series of sets of keys, a series of movable frames actuated thereby, one for each set of keys, a driving mechanism common to all of the sets of keys, for actuating them, and a lock for each movable frame controlled by the keys of the corresponding set and operating to lock said frame from movement except when released by the operation of one of said keys, whereby all of the frames are normally locked from movement and each is unlocked by the operation of any one of the keys of its set.

8. The combination of a series of keys, a movable frame actuated thereby and moved positive movements of different degrees by the different keys, the respective keys beginning to move said frame at different points in their own uniform movements, and a lock controlled by the keys for normally locking said frame from movement and releasing it at the operation of any key immediately before such key begins to move the frame.

9. The combination of a series of keys, a movable frame actuated thereby and returned to a normal or initial position at the end of each operation of any key, a movable locking device intermediate said frame and a fixed member and operating to lock said frame from movement when in normal or initial position, and means intermediate the keys and said locking device for releasing said frame at the operation of any one of the keys, to permit such key to move the frame.

10. The combination of a series of keys, a movable frame actuated thereby, said frame being moved from normal position at the operation of any key and returning to such position with the key, a locking device movably mounted upon said frame and coöperating with a fixed member to normally lock said frame from movement, and means intermediate the keys and said locking device for disengaging it from the fixed member and releasing the movable frame at the operation of any one of the keys.

11. The combination of a series of sets of keys, a series of movable frames actuated thereby, one for each set of keys, a driving mechanism common to all of the sets of keys, for actuating them, a locking device mounted upon each of said frames and coöperating with a fixed member to normally lock the frame from movement, and means intermediate the keys of each set and the locking device of the corresponding movable frame for disengaging the locking device from the fixed member and releasing the frame at the operation of any key in its set.

12. The combination of a series of keys, a movable frame, a series of graduated lifters or actuating devices intermediate the keys and frame for transmitting the movements of the keys to the frame and causing the uniform movements of the keys to impart different degrees of movement to the frame, and a locking device operating to normally lock said frame from movement and coöperating with said lifters to release the frame at the operation of any one of the keys.

13. The combination of a series of keys, a movable frame actuated thereby, a series of graduated lifters or actuating devices intermediate the keys and frame for transmitting the movements of the keys to the frame and causing the uniform movements of the keys to impart different degrees of movement to the frame, and a locking member pivotally mounted upon the movable frame and coöperating with a fixed member and with the lifters, to normally lock the movable frame and to release it at the operation of any one of the keys.

14. The combination of the key-levers A, the movable registering-frame, the lifters L intermediate the keys and frame, the fixed cross-bar S, the locking-frame H′ pivoted upon the movable frame and having a locking coöperation with the cross-bar S and a releasing coöperation with the lifters L, substantially as described.

15. The combination of the series of sets of key-levers, the bar Y common to said levers, with means for giving it a uniform movement at each operation and for connecting the levers with it at will, the series of registering-frames, one for each set of key-levers, the graduated set of lifters L between each set of key-levers and corresponding registering-frame, the fixed bar S', and the locking-frames H' carried by the registering-frames and coöperating with the bar S and with the lifters L for the purpose described.

16. The combination, with the key-levers A', the bar Y common thereto, and means for connecting the levers to said bar at will, of the rotary cam T coöperating with the arm X' of said bar, to move the bar in one direction, and the rotary cam Y' and the lever W' intermediate the same and the bar Y, for moving the latter in the opposite direction, substantially as described.

17. In a cash-recorder or check-printer, the combination of the cash-recording type-wheels $C^2$, the consecutive-numbering type-wheels $E^2$, the dating-wheels $I^2 J^2 K^2$, and the setting-disks $O^2 P^2 Q^2$ for said dating-wheels, all mounted side by side upon the same axis, means for inking said wheels, the vibrating platen-arm $U^2$ carrying the transverse platen-bar $S^2$ extending across all of said wheels, and means for actuating the platen-arm $U^2$ to throw the platen-bar $S^2$ against said wheels, to effect the printing of the date, consecutive number and amount in a single line across the paper strip, substantially as and for the purpose described.

18. In a cash-recorder or check-printer, the combination, with the type-wheels, of an ink-supply fount, an inking strip or pad and means for moving the same back and forth between said fount and the printing-point, an impression-platen, and means for throwing the same toward the types twice in succession at each operation of the machine, said platen at one stroke operating to force the inking-strip against the types, to ink the same, and at its other stroke operating to force the paper strip against the inked types, to effect the printing.

19. In a cash-recorder, or check-printer, the combination, with the type-wheels, of an ink-supply fount, an inking-strip movable back and forth between the same and the printing-point, an impression-platen, and suitable cams and springs coöperating with the inking-strip and platens to move the strip to the printing-point and then throw the platen against it to cause it to ink the types, and to then withdraw the inking-strip and throw the platen toward the types a second time, to force the paper strip against the types and effect the printing.

20. In a cash-recorder and check-printer, the combination, with the type-wheels having the diametrically opposite duplicate series of types, of an ink-fount located at one side of said wheels, a pair of inking-strips movable back and forth between said fount and the printing-lines at opposite sides of the type-wheels, to carry the ink from the fount to the types, two impression-platens, one above and the other below the type-wheels, and means for moving the inking-strips to the printing-lines at opposite sides of the wheels and then throwing the platens against said strips to cause the latter to engage the types, and for then withdrawing the strips and throwing the platens toward the types a second time, to force the paper check-strip and record-strip against the types at the opposite sides of the wheels to effect the printing.

21. The combination of the type-wheels, the ink-fount $E^3$, the transverse inking-strip $L^3$ carried by a suitable movable support and normally resting in position to receive ink from said fount, a spring for yieldingly holding said strip in and returning it to normal position, a cam for moving it from normal position to the printing-line, the impression-platen $S^2$ carried by a suitable support, a spring tending to throw said platen against the types, and a rotary cam or cams coöperating with the support of said platen to permit the spring to throw the platen toward the types twice in succession at each operation, once while the inking-strip is in position at the printing-line, and once after said strip has been withdrawn from said position, substantially as and for the purpose described.

22. The combination of the type-wheels, the inking-fount $E^3$, the inking-strip $L^3$ carried by a suitable movable support and normally resting in position to receive ink from said fount, a cam and a spring coöperating with said inking-strip or its support to move the strip back and forth from normal position to the printing-line, the impression-platen $S^2$ carried by a pivoted supporting-frame, the spring $X^2$ connected to said frame and tending to throw the platen toward the type-wheels, and the rotary disk $A^3$ coöperating with the platen-supporting frame in the manner and for the purpose described.

23. The combination of the type-wheels having the diametrically opposite duplicate series of types, the inking-fount $E^3$ arranged in rear thereof, the pair of transverse inking-strips $K^3 L^3$ and means for moving the same back and forth from the ink-fount to the printing-lines, and the two impression-platens $S^2$ and means for throwing the same toward the type-wheels twice in succession at each operation, said platen and inking-strips coöperating with each other in the manner and for the purpose described.

24. The combination of the type-wheels having the diametrically opposite duplicate series of types, the ink-fount $E^3$ located immediately in rear thereof, the transverse inking-strips $K^3 L^3$ normally resting against the upper and lower sides of the ink-fount, the plates $M^3 N^3$ coöperating with the inner ends of said inking-strips, the arms $I^3 J^3$ to which the outer ends of said strips are secured, the swinging arms $H^3$ to whose upper end the arms $I^3 J^3$ are pivoted, the cam $Q^5$ and spring $R^5$ coöperating with the arm $H^3$, the platens $S^2$ carried by pivoted frames having the coöperating arms $Y^2$, the springs $X^2$ connected to said frames, and the rotary disk $A^3$ having the two cam-surfaces and intermediate notches or cut-away spaces coöperating with one of said platen-supporting frames, substantially as and for the purpose described.

25. The combination, with the impression-roller $D^4$, type-roller $E^4$ and inking-roller $L^4$, of the ink-fount $N^4$ mounted upon a movable support and normally out of inking coöperation with the roller $L^4$, and the rotary cam $Q^4$ coöperating with the ink-fount to intermittently move the same into position to ink the roller $L^4$, substantially as described.

26. The combination of the spring-pressed pivoted arm or lever $W^5$, the vibrating platen-supporting arm $U^2$ secured thereto, the fixed and unyielding stop $D^3$ coöperating with the arm $U^2$, and the platen-bar $S^2$ yieldingly connected to said arm $U^2$, as and for the purpose described.

27. The combination of the vibrating platen-supporting arm $U^2$, the stop $D^3$ coöperating therewith, the platen-bar $S^2$ fitting against one side of said arm, the screws passing loosely through said arm and entering said platen-bar, and the coiled springs $C^3$ surrounding said screws and confined between the heads thereof and the arm $U^2$, as and for the purpose described.

THOMAS CARNEY.

Witnesses:
ALVARD MACAULEY,
PEARL N. SIGLER.